United States Patent [19]

Cooper et al.

[11] Patent Number: 4,703,614
[45] Date of Patent: Nov. 3, 1987

[54] CYCLONE FORAGE HARVESTER

[76] Inventors: George N. Cooper; Douglas W. Cooper, both of Site 7, Comp. 13,R.R. 1,, Chase, British Columbia, Canada, VOE 1MO

[21] Appl. No.: 826,101

[22] Filed: Feb. 6, 1986

[51] Int. Cl.[4] .................. A01D 34/43; A01D 87/10
[52] U.S. Cl. .................... 56/16.6; 56/13.4; 56/17.5; 241/101.7
[58] Field of Search .............. 56/16.6, 17.5, 13.3, 56/13.4; 241/101.7, 222

[56] References Cited

U.S. PATENT DOCUMENTS

| Re. 24,169 | 6/1956 | Arrington | 56/23 |
|---|---|---|---|
| 2,177,911 | 10/1939 | Lommerfeld | 56/16 |
| 2,605,800 | 8/1952 | Mateu | 146/107 |
| 2,946,169 | 6/1960 | Soteropulos | 56/16 |
| 3,598,326 | 8/1971 | Pennell | 241/102 |
| 3,732,674 | 5/1973 | Guillory | 56/13.1 |
| 4,074,869 | 2/1978 | Johnson | 56/13.1 |
| 4,594,841 | 6/1986 | Wistuba et al. | 241/101.7 |

FOREIGN PATENT DOCUMENTS

| 0995108 | 8/1976 | Canada | 241/101.7 |
|---|---|---|---|
| 0713491 | 8/1954 | United Kingdom | 241/101.7 |

Primary Examiner—James A. Leppink
Assistant Examiner—Terry Lee Melius
Attorney, Agent, or Firm—Fleit, Jacobson, Cohn & Price

[57] ABSTRACT

A forwardly opening cylindrical housing is mounted on the forward end of a wheeled frame coupled to the front of self-propelled prime mover and the rear of the housing includes a forwardly facing axial inlet and radial discharge rotor assembly mounted therein. The housing includes a tangential outlet for the rear end thereof aligned with the rotor assembly and the outlet has the inlet end of conduit means connected thereto for conveying large volumes of air having forage entrained therein to a remote bin into which the discharge end of the conduit opens. The forward end of the housing includes generally diametric stationary bar structure and a forward extension of the rotor shaft includes radial cutting blades spaced slightly axially from the stationary bar.

10 Claims, 4 Drawing Figures

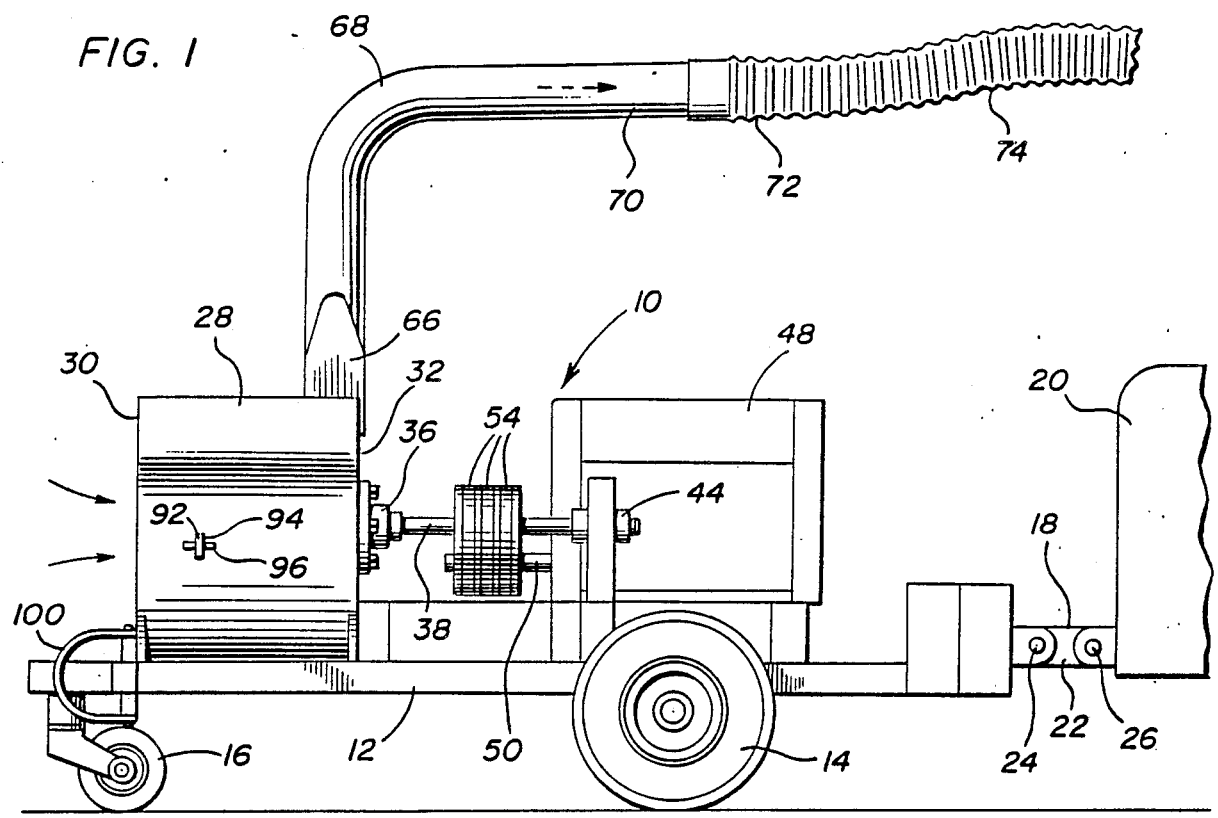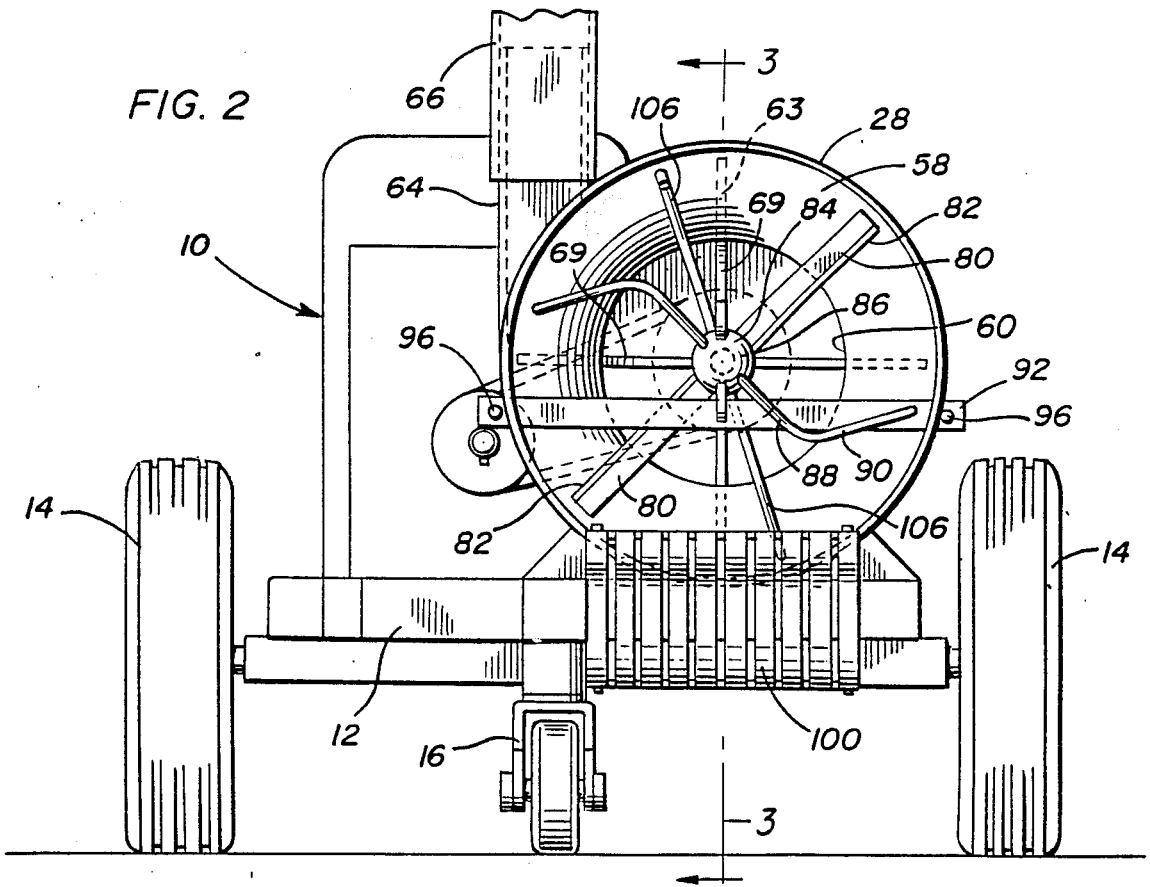

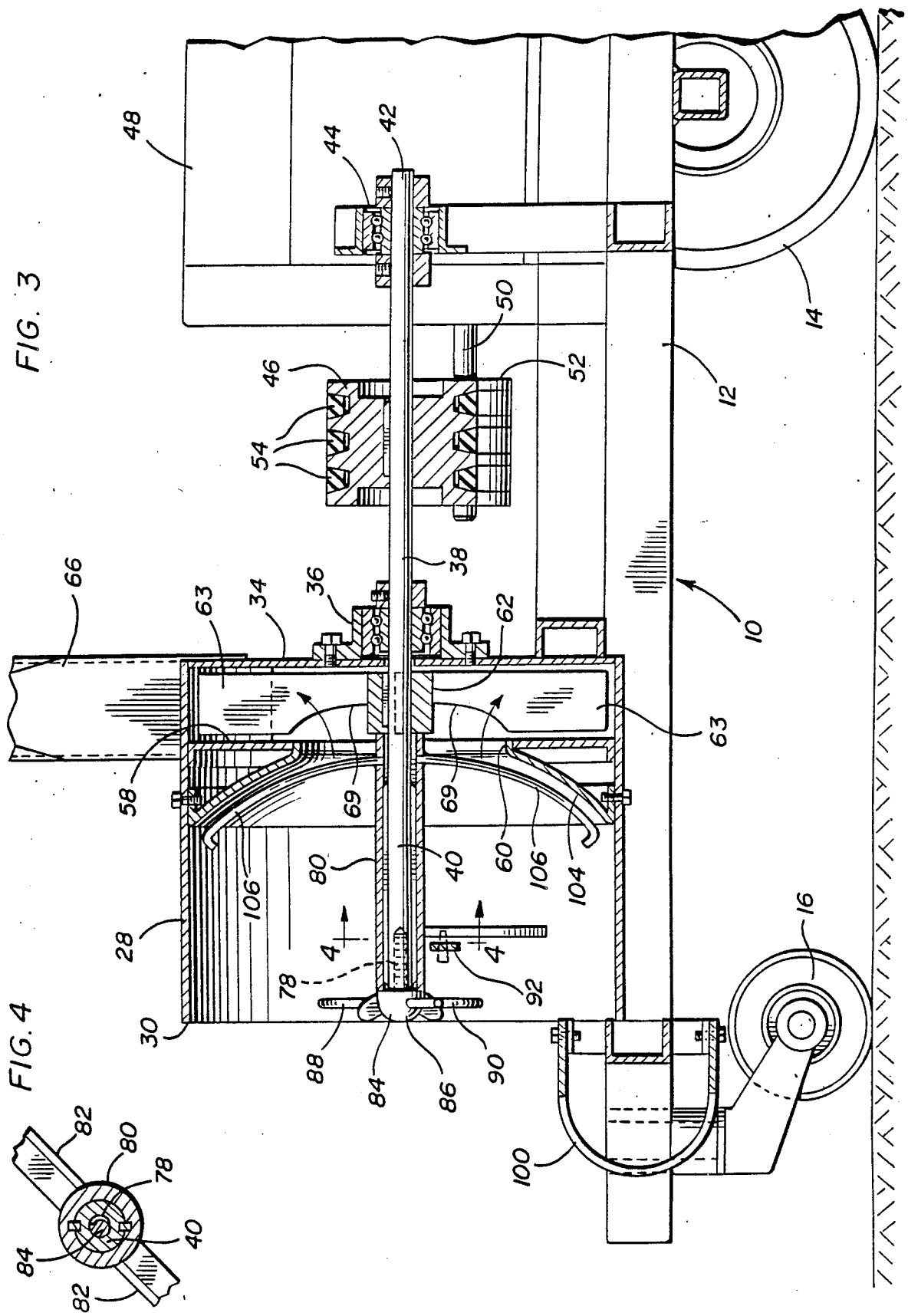

CYCLONE FORAGE HARVESTER

BACKGROUND OF THE INVENTION

1. Field of the Invention

This invention relates to a cyclone-type forage harvester to be propelled by a self-propelled vehicle including a forage receiving bin.

Various different forms of forage harvesters of the self-propelled type and motorized vehicle propelled type heretofore have been provided. The harvester of the instant invention has been specifically designed to be propelled by a truck-type vehicle or the like provided with a storage bin for receiving the forage harvested by the harvester and the harvester is of the type whereby it is mounted on the front of the truck, steered by the latter and operative to discharge harvested forage directly into the storage bin of the truck.

2. Description of Related Art

Of the various different types of previously known forms of forage harvesters, those disclosed in U.S. Pat. Nos. 2,177,911, 2,605,800, 2,946,169, 3,372,674, 4,074,869, 4,349,211 and No. Re. 24,169 include structural features which are generally similar to some of the structural features incorporated in the instant invention.

However, these previously known forms of harvesters and similar equipment have not been specifically designed to provide an effective means of harvesting various different forms of forage materials as well as forage materials which may be slightly damp. Accordingly, a need exists for an improved form of forage harvester.

SUMMARY OF THE INVENTION

The harvester of the instant invention is designed to be hitched to the forward end of a farm truck or other self-propelled vehicle or the like equipped with a storage bin into which harvested forage may be discharged. The harvester is to be coupled to the front of the attendant vehicle and to be propelled and steered thereby. The forage harvester may receive forage from a windrower or corn head and is operative to receive, fluff and cut the forage as well as to discharge the fluffed and cut forage at a high rate of speed with the forage contained within a high volume and velocity airflow generated by a turbine assembly incorporated in the forage harvester. The high volume and velocity airflow is capable of conveying the fluffed and cut forage to a remote bin for receiving the same through a suitable air and forage flow conduit extending from the turbine outlet of the harvester to the associated bin.

The main object of this invention is to provide a forage harvester for receiving forage from a windrow or corn head and fluffing, cutting and conveying the forage to a mobile forage receiving bin.

Another object of this invention is to provide a harvester which may be propelled and steered from the motor driven chassis supporting the associated storage bin.

Yet another object of the invention is to provide a forage harvester which is particularly well adapted for handling damp forage.

Still another important object of this invention is to provide a forage harvester of the turbine type and including structure whereby cutting and fluffing blades rotatable with the turbine may be readily removed for maintenance and/or replacement.

Another object of this invention is to provide a forage harvester of the turbine type and constructed in a manner whereby the turbine of the harvester may be driven from any suitable power source.

A final object of this invention to be specifically enumerated herein is to provide a forage harvester in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a side elevational view of the forage harvester of the instant invention as seen from the left side thereof and with the rear of the harvester anchored relative to the forward portion of a motive vehicle for propelling and steering the harvester;

FIG. 2 is an enlarged front elevational view of the harvester;

FIG. 3 is an enlarged fragmentary longitudinal vertical sectional view taken substantially upon the plane indicated by the section line 3—3 of FIG. 2; and FIG. 4 is an enlarged transverse vertical sectional view taken substantially upon the plane indicated by the section line 4—4 of FIG. 3.

DESCRIPTION OF THE PREFERRED EMBODIMENT

Referring now more specifically to the drawings, the numeral 10 generally designates the forage harvester of the instant invention. The harvester 10 includes a main frame 12 having opposite side rear wheels 14 and a central forward dirigible wheel 16. The rear of the frame 12 is coupled as at 18 to the front of a self-propelled vehicle 20 such as a truck. The coupling connection at 18 includes connecting link structure 22 pivotally attached at its opposite ends to the harvester frame 12 and the front of the truck 20 as at 24 and 26, respectively.

The harvester 10 includes a generally cylindrical housing 28 mounted in horizontal position on the frame 12 extending longitudinally thereof and the housing includes a front end 30 which is open and a rear end 32 closed by a centrally apertured rear end wall 34 removably supporting a central bearing journal structure 36 therefrom. The intermediate portion of a shaft 38 is journalled from the bearing journal structure 36 and includes a front end portion 40 disposed in the housing 28 and terminating forwardly a spaced distance rearward of the front end 30 of the housing 28. The shaft 38 includes a rear end 42 journalled from a second bearing journal structure 44 mounted from the frame 12 and a multiple groove pulley 46 is mounted on the shaft 38 centrally intermediate the bearing journal structures 36 and 44.

The rear of the frame supports a combustion engine 48 mounted centrally over the wheels 14 and the engine 48 includes a rotary output shaft 50 having a multiple groove pulley mounted thereon aligned with the pulley 46. A plurality of endless flexible drive members such as belts 54 are trained about the pulleys 52 and 46 and thereby drivingly connect the shaft 50 the shaft 38.

The interior of the housing 28 includes an annular partition 58 spaced approximately one-quarter the length of the housing 28 forward of the end wall 34 thereof and the partition 58 includes an inner periphery 60 which is of a diameter slightly greater than one-half the diameter of the housing 28.

A bladed rotor 62 including generally radial blades 63 is mounted on the shaft 38 for rotation therewith intermediate the end wall 34 and the partitition 58 and, in conjunction with the rear wall 34 and partition 58, defines an axial inlet and radial outlet blower assembly, the housing 28 including a tangential outlet 64 to which the inlet end 66 of a discharge pipe 68 is connected. The blades 63 are relieved as at 69 and discharge pipe 68 includes a horizontally and rearwardly directed outlet end 70 to which the inlet end 72 of a flexible hose 74 is connected, the discharge end of the flexible hose 74 opening into a suitable forage receiving bin (not shown) supported from the rear portion of the truck 20.

The front end portion 40 of the shaft 38 includes a threaded blind bore 78 and a sleeve 80 is telescoped over the front end portion 40 of the shaft 38 projecting forwardly of the rotor 62. The sleeve 80 mounts a pair of diametrically opposite radial blades 80 therefrom including sharpened longitudinal edges 82 and a bolt 84 is threaded in the bore 78 and against the forward end of the sleeve 80. The bolt 84 includes a wing nut-type head 86 from which a pair of diametrically opposite fluffer bars 88 are supported, the fluffer bars 88 including general radial inner ends and angulated trailing outer ends 90.

In addition to the blades 80 and the bars 88, the housing 28 includes a stationary bar 92 mounted therefrom and disposed closely under the forward end of the sleeve 80. The bar 92 includes opposite ends which project through opening 94 formed in opposite sides of the housing 82 and each bar end includes a removable pin 96 secured therethrough closely outward of the corresponding side of the housing 28 in order to retain the bar 92 in position. Of course, the bar 92 may be removed merely by removing one of the pins 96 and then longitudinally retracting the bar 92 through the openings 94.

If it is necessary to change or to repair the blades 80 or the bars 88, it is merely necessary to remove the bolt 84 and the sleeve 80. Removal of the bar 92 will facilitate removal of the sleeve 80.

The forward end of the frame 12 supports a curved and slotted guide assembly 100 for assisting in guiding the forage into the forward end of the housing 28 and the large quantity of air pumped from within the housing 28 and outwardly through the tangential outlet 64 by the rotor 62 causes large quantities of ambient air to enter the forward end of the housing 28 to further assist in movement of the forage into housing 28.

The bars 88 serve to fluff the forage entering the forward end of the housing 28 and the bar 92 and blades 80 serve to perform a cutting action on the forage before the latter passes through the opening defined by the inner periphery 60 of the partition 58 and into the rotor chamber of the housing 28 defined between the partition 58 and the end wall 34. Of course, the rotor 62 acts upon the forage within the rotor chamber and expels the cut forage through the tangential outlet 64 together with large volumes of high velocity air.

The partition 58 includes a centrally apertured and forwardly concave dished front wall 104 and the rear end of the sleeve 80 includes a pair of arcuate wiper bars 106 mounted thereon for sweeping over the front face of the front wall 104 in slightly spaced relation thereto. Accordingly, there is no opportunity for forage to build up on the front wall 104 and to restrict the flow of forage and air through the center of the partition 58.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A forage harvester for propelling and steering from the forward end of a prime mover, said harvester including an elongated frame, means adjacent the rear end of said frame for support of said frame from the front of a prime mover, depending wheel means carried by the forward end of said frame, a generally horizontally disposed cylindrical housing supported on said forward end of said frame and opening axially forwardly of the latter, the rear end of said housing being closed, impeller shaft means centrally journalled through said closed rear end of said housing and including a rear end disposed rearward of said closed end and a forward end projecting into the forward end of said housing, a transverse, generally annular baffle mounted in the rear end of said housing, spaced forward of the closed end thereof and including a forward facing front side, a forwardly facing axial intake and radial discharge bladed rotor mounted on said shaft means for rotation therewith between said closed end and said baffle, the rear end of said housing including a generally tangential outlet opening outwardly therefrom and radially aligned with said rotor, a plurality of generally radial cutting blades mounted on said shaft for rotation therewith forward of said baffle, motor means carried by said frame and drivingly connected to said shaft means rearward of said closed end of said housing and for rotating said rotor in a direction corresponding to the tangential direction extending outward of said outlet, said blades including sharpened edges facing in the direction of said shaft, a plurality of fluffer bars carried by said shaft forward of said stationary bar means, each of said fluffer bars including inner base ends anchored relative to said shaft and extending generally radially thereof and outer free ends angulated relative to said base ends in a trailing direction opposite to the direction of rotation of said shaft.

2. The harvester of claim 1 including stationary bar means mounted in said housing forward of said radial blades and including bar portions spaced about said shaft and extending generally radially of the axis of rotation of said shaft.

3. The havester of claim 1 including first bearing means on said end of said housing from which said shaft means is journalled and second bearing means supported from said frame rearward of said closed end of said housing, said motor means including a rotary output shaft portion generally paralleling said shaft means, aligned wheel means carried by said shaft portion and shaft means, and elongated flexible drive member means trained about said wheel means.

4. The harvester of claim 1 wherein said means adjacent the rear end of said frame for support of said frame from the front of a prime mover includes means for pivotally mounting said frame from the prime mover for oscillation of said frame about a horizontal transverse axis relative to said prime mover.

5. The harvester of claim 4 wherein said depending wheel means comprises dirigible wheel means.

6. The harvester of claim 1 wherein said front side is forwardly concave.

7. A forage harvester for propelling and steering from the forward end of a prime mover, said harvester including an elongated frame, means adjacent the rear end of said frame for support of said frame from the front of a prime mover, depending wheel means carried by the forward end of said frame, a generally horizontally disposed cylindrical housing supported on said forward end of said frame and opening axially forwardly of the latter, the rear end of said housing being closed, impeller shaft means centrally journalled through said closed rear end of said housing and including a rear end disposed rearward of said closed end and a forward end projecting into the forward end of said housing, a transverse, generally annular baffle mounted in the rear end of said housing, spaced forward of the closed end thereof and including a forward facing front side, a forwardly facing axial intake and radial discharge bladed rotor mounted on said shaft means for rotation therewith between said closed end and said baffle, the rear end of said housing including a generally tangential outlet opening outwardly therefrom and radially aligned with said rotor, a plurality of generally radial cutting blades mounted on said shaft for rotation therewith forward of said baffle, motor means carried by said frame and drivingly connected to said shaft means rearward of said closed end of said housing and for rotating said rotor in a direction corresponding to the tangential direction extending outward of said outlet, said blades including sharpened edges facing in the direction of said shaft, stationary bar means mounted in said housing forward of said radial blades and including bar portions spaced about said shaft and extending generally radially of the axis of rotation of said shaft, said bar means comprising an elongated bar extending fully across said housing and having opposite ends projecting through generally radial openings provided therefor in opposite sides of said housing, and means removably securing said opposite ends through said openings.

8. The harvester of claim 7 including a plurality of fluffer bars carried by said shaft forward of said stationary bar means, each of said fluffer bars including inner base ends anchored relative to said shaft and extending generally radially thereof and outer free ends angulated relative to said base ends in a trailing direction opposite to the direction of rotation of said shaft.

9. The harvester of claim 8 wherein said cutting blades are mounted from opposite sides of a support sleeve removably mounted on the forward end of said shaft means.

10. A forage harvester for propelling and steering from the forward end of a prime mover, said harvester including an elongated frame, means adjacent the rear end of said frame for support of said frame from the front of a prime mover, depending wheel means carried by the forward end of said frame, a generally horizontally disposed cylindrical housing supported on said forward end of said frame and opening axially forwardly of the latter, the rear end of said housing being closed, impeller shaft means centrally journalled through said closed rear end of said housing and including a rear end disposed rearward of said closed end and a forward end projecting into the forward end of said housing, a transverse, generally annular baffle mounted in the rear end of said housing, spaced forward of the closed end thereof and including a forward facing front side, a forwardly facing axial intake and radial discharge bladed rotor mounted on said shaft menas for rotation therewith between said closed end and said baffle, the rear end of said housing including a generally tangential outlet opening outwardly therefrom and radially aligned with said rotor, a plurality of generally radial cutting blades mounted on said shaft for rotation therewith forward of said baffle, motor means carried by said frame and drivingly connected to said shaft means rearward of said closed end of said housing and for rotating said rotor in a direction corresponding to the tangential direction extending outward of said outlet, said blades including sharpened edges facing in the direction of said shaft, said shaft including a plurality of generally radial, arcuate wiper bars mounted thereon for rotation therewith and with said wiper bars positioned and contoured to sweep over said baffle front side in slightly spaced relation thereto, said front side being forwardly concave.

* * * * *